US010352494B2

(12) United States Patent
Sapsay et al.

(10) Patent No.: US 10,352,494 B2
(45) Date of Patent: Jul. 16, 2019

(54) METHOD FOR THERMALLY INSULATING WELDED JOINTS OF PRE-INSULATED PIPES

(71) Applicants: Public Joint Stock Company "Transneft", Moscow (RU); Joint-stock company "Transneft Siberia", Tyumen (RU); L.L.C. "Transneft Research and Development Institute for Oil and Oil Products Transportation", Moscow (RU)

(72) Inventors: Alexey Nikolaevich Sapsay, Moscow (RU); Vitaly Ivanovich Surikov, Balashikha (RU); Inna Yakovlevna Fridlyand, Moscow (RU); Nikolai Nikolaevich Skuridin, Moscow (RU); Vyacheslav Vladimirovich Pavlov, Sankt-Peterburg (RU); Pavel Ivanovich Shoter, Moscow (RU)

(73) Assignees: Public Joint Stock Company "Transneft", Moscow (RU); Joint-Stock Company "Transneft Siberia", Tyumen (RU); L.L.C. "Transneft Research and Development Institute for Oil and Oil Products Transportation", Moscow (RU)

( * ) Notice: Subject to any disclaimer, the term of this patent is extended or adjusted under 35 U.S.C. 154(b) by 349 days.

(21) Appl. No.: 15/227,849

(22) Filed: Aug. 3, 2016

(65) Prior Publication Data
US 2016/0341351 A1 Nov. 24, 2016

Related U.S. Application Data

(63) Continuation of application No. PCT/RU2014/000214, filed on Mar. 28, 2014.

(51) Int. Cl.
*F16L 59/20* (2006.01)
*F16L 58/18* (2006.01)
(Continued)

(52) U.S. Cl.
CPC .......... *F16L 59/20* (2013.01); *F16L 13/0272* (2013.01); *F16L 58/181* (2013.01); *F16L 59/145* (2013.01)

(58) Field of Classification Search
CPC ...... F16L 59/20; F16L 58/181; F16L 13/0272
(Continued)

(56) References Cited

U.S. PATENT DOCUMENTS 3,711,124 A 1/1973 Gerholt et al.
4,019,761 A * 4/1977 Heidemann ............. F16L 59/20
285/47

(Continued)

FOREIGN PATENT DOCUMENTS

CA 1320618 7/1993
CN 201302016 9/2009
(Continued)

OTHER PUBLICATIONS

Protection of Girth Weld Joints on Thermally Insulated Pipe; http://www.arguslimited.com/en/pipeline_corrosion_protection/girth_weld_joints_protection; (1 page).
(Continued)

*Primary Examiner* — Aaron M Dunwoody
(74) *Attorney, Agent, or Firm* — One LLP; Jonathan Jaech

(57) ABSTRACT

The invention relates to pipe heat insulation and to methods of heat insulation installation on weld joints of pipes for transportation of oil and oil products. The heat insulation of pipe weld joints for subsurface pipelining mounting includes an anticorrosive protection of welded pipe joints using
(Continued)

heat-shrinkable polymeric tape, heat insulating polyurethane foam pipe coverings mounted on the junction, that are held together with a tie strap locks, hot-melt adhesive tape glued at the edges of the pipe protective envelope with overlap on the pipe coverings of polyurethane foam and protective galvanized metal casing installed symmetrically relative to the center of the weld joint, the surface of which is sealed with a heat-shrinkable polymeric fabric.

9 Claims, 2 Drawing Sheets

(51) Int. Cl.
*F16L 13/02* (2006.01)
*F16L 59/14* (2006.01)

(58) Field of Classification Search
USPC ....... 285/47, 48, 295.1, 294.3, 294.4, 294.1, 285/293.1
See application file for complete search history.

(56) References Cited

U.S. PATENT DOCUMENTS

| | | | |
|---|---|---|---|
| 4,134,529 A | 1/1979 | Hara et al. | |
| 4,459,251 A * | 7/1984 | Eldridge | B29C 44/1219 138/112 |
| 4,629,216 A | 12/1986 | Pedersen | |
| 4,660,861 A * | 4/1987 | Argy | F16L 59/029 138/149 |
| 5,188,775 A | 2/1993 | Hornback et al. | |
| 5,900,195 A | 5/1999 | Pool et al. | |
| 6,059,319 A | 5/2000 | Wyke | |
| 6,355,318 B1 | 3/2002 | Tailor et al. | |
| 6,505,650 B2 | 1/2003 | Bohon et al. | |
| 7,407,197 B2 | 8/2008 | Gronquist | |
| 7,472,476 B2 | 1/2009 | Gronquist | |
| 8,061,582 B2 * | 11/2011 | Cittadini Bellini | B23K 37/0533 228/176 |
| 8,810,264 B2 | 8/2014 | Bohon et al. | |
| 8,840,977 B2 | 9/2014 | Tailor et al. | |
| 2002/0163182 A1 * | 11/2002 | Kirkegaard | F16L 59/20 285/47 |
| 2004/0145178 A1 * | 7/2004 | Ball | F16L 58/04 285/48 |
| 2005/0156429 A1 | 7/2005 | Muckenschnabel et al. | |
| 2006/0272727 A1 | 12/2006 | Dinon et al. | |
| 2007/0059468 A1 | 3/2007 | Kirkegaard et al. | |
| 2007/0241558 A1 | 10/2007 | Nestegard et al. | |
| 2008/0206543 A1 | 8/2008 | Whitaker et al. | |
| 2010/0319839 A1 | 12/2010 | Shumate | |
| 2011/0175346 A1 * | 7/2011 | Grieser-Schmitz | C08G 18/225 285/47 |
| 2012/0037256 A1 | 2/2012 | Shumate et al. | |
| 2014/0311614 A1 | 10/2014 | Edmondson et al. | |
| 2015/0041017 A1 | 2/2015 | Hegdal et al. | |
| 2016/0168719 A1 | 6/2016 | Chuyko et al. | |
| 2016/0178111 A1 | 6/2016 | Ali | |
| 2016/0341350 A1 * | 11/2016 | Sapsai | F16L 59/20 |
| 2016/0341351 A1 * | 11/2016 | Sapsay | F16L 59/20 |
| 2016/0341352 A1 * | 11/2016 | Sapsai | F16L 59/20 |

FOREIGN PATENT DOCUMENTS

| | | |
|---|---|---|
| CN | 201982883 | 9/2011 |
| EP | 0079702 | 5/1983 |
| EP | 0188363 | 7/1986 |
| EP | 1288558 | 3/2003 |
| EP | 2166269 | 3/2010 |
| EP | 2957812 | 12/2015 |
| GB | 1176418 | 1/1970 |
| GB | 1483143 | 8/1977 |
| GB | 2319316 | 5/1998 |
| RU | 2235246 | 8/2004 |
| RU | 2297572 | 4/2007 |
| RU | 2343340 | 1/2009 |
| RU | 2530943 | 10/2014 |
| RU | 2575528 | 2/2016 |
| WO | WO2014028444 | 2/2014 |
| WO | WO2015079249 | 6/2015 |
| WO | WO2015143289 | 9/2015 |
| WO | WO2015147677 | 10/2015 |

OTHER PUBLICATIONS

Joint Protection of Pre-Insulated Pipes; http://www.tial.ru/joint_protection_of_pre-Insulated_pipes/?lang=en; (4 pages).
Driesen, H.E. et al.; "*Amendment of DIN Standard 30672 'Coverings made from corrosion-protection bands and heat-shrink materials'*"; GWF Journal, vol. 131, Issue 6; (2 pages).
Mezhgosudarstvenny standart. Truby i fasonnye izdelia stalnye s teplovoi izoliatsiei iz penopoliuretana s zashchitnoi obolochkoi. Tekhnicheskie uslovia. "*Pipes and fitings with thermal insulation STEEL polyurethane foam Sheathed*"; GOST 30732-2006, M., Standartinform, 2007, p. 5, claim 4.9; (98 pages).

* cited by examiner

METHOD FOR THERMALLY INSULATING WELDED JOINTS OF PRE-INSULATED PIPES

CROSS-REFERENCE TO RELATED APPLICATIONS

This application claims the benefit and priority of PCT Pat. App. No. PCT/RU2014/000214, titled METHOD FOR THERMALLY INSULATING WELDED JOINTS OF PRE-INSULATED PIPES and filed on Mar. 28, 2014, also published as WO/2015/147679.

FIELD

The invention relates to the field of pipelines construction and can be used for insulating non-detachable welded joints (welded seams) of pre-insulated pipelines for transportation of oil and oil products in severe climatic conditions at low temperatures.

BACKGROUND

Various fabrications of heat-insulating joints of pre-insulated pipelines are known. For example, patent for invention GB2319316, published on May 20, 1998, IPC F16L 59/20, discloses one such fabrication. This fabrication includes joining the pipelines' ends to each other, installing a polymeric coupling on the joint with its ends covering the ends of polymeric jackets of the pipelines, welding the coupling's longitudinal weld, joining the coupling with the ends of jackets of the pipelines to be coupled, checking for tightness of the coupling and jackets, and filling the space between the inner and outer surface of the coupling. The outer surface of the joined pipelines and ends of the pipeline include heat insulation with heat-insulating material.

Another method for joining isolated metal pipes is disclosed by patent for invention GB1483143, published on Aug. 17, 1977, IPC F16L 59/20. According to this reference, two metal pipes, each of which has a hose made of insulating material such as rigid polyurethane foam, and end lugs at a distance from the pipe edge are welded and insulated with an additional heat-insulating material. The heat-insulating material includes two half sections, which are disposed around the weld. The hoses include heat-shrinkable plastic material that is placed on the additional heat-insulating material and on a portion of a bush that is connected to each pipe. The bush is heated to capture the insulating material. Optionally, the sealing bush made of material used for the hose is installed over the end of the insulation on the pipe before installing the bush, and the welded joint is covered with anticorrosive coating prior to application of an additional insulating material.

Another method for sealing the joint between two insulated pipes is disclosed by patent for invention EP0079702, published on May 14, 1986, IPC F16L 59/20. According to this reference, water and heat insulation of welded joints of pipes is made using heat-shrinkable materials and heat-insulating pipe coverings. The outer joint between the pipeline and the housing, that covers the heat-insulating pipe coverings, is further protected with heat-shrinkable material. The polymeric material is coated with a sealant, such as mastic, and heat-activated adhesive, such as hot melt adhesive. The coated material forms a bush which can have a tubular or circular configuration. The sealant provides a flexible waterproof seal around the welded joint, and the adhesive provides a second seal and prevents any movement of the hose and the pipe.

Another method of providing an anticorrosive insulation of welded joints of a pipeline and a device for its implementation are disclosed by patent for invention RU2398155, published on Aug. 10, 2012, IPC F16L 13/02. According to this reference, a heat-shrinkable coupling is first placed on the pipeline near a joint before welding the pipeline ends. After the joints have been welded, the surface to be insulated is cleaned with metal brushes, drained from moisture, and coated with a primer and mastic tape, which is a coating with softening mastic material temperature of 80-90° C. Afterwards, the heat-shrinkable coupling is shifted, mounted in the area of the welded joint symmetrically to the joint, and heated to shrinkage temperature of 110-120° C. The mastic tape layers are heated and melted through the heat-shrinkable coupling to ensure simultaneous pressure on the molten mastic of the mastic tape to use it for filling the cavities in the area of the welded joint reinforcement (tent areas) and the places of transition to the base coating and overlapping layers of the mastic tape.

A heat-insulating joint of pre-insulated pipelines is disclosed by patent for invention RU2235246, published on May 20, 2010, IPC F16L 59/18). The heat-insulating joint of pre-insulated pipelines is interconnected by welding and includes a metal housing, wrapped around the joint and arranged symmetrically to the joint center. The joint also includes polyurethane foam filling the space between the inner surface of the metal housing, the outer surface of interconnected pipelines and the ends of the heat-insulating material of these pipelines. A polymeric coating is used as a heat-shrinkable fabric with an adhesive layer superimposed on the metal housing. The heat-shrinkable polymeric coating is connected with its ends covering the low-pressure polyethylene envelopes. The metal housing has a filling orifice and a conical plug. The heat-insulating joint of pre-insulated pipelines is implemented as follows. A metal housing is mounted symmetrically to the joint center by wrapping it around the joint. The space between the inner surface of the housing, the outer surface of interconnected pipelines and the ends of the heat-insulating materials of these pipelines is filled with polyurethane foam. After that the surface of the metal housing in the joint area is activated by heating it with a gas burner flame of 90-100° C. The polyethylene envelope and metal housing are covered with an applicator made of heat-shrinkable fabric and heated to the sweating temperature, then the surface of the metal housing is re-activated in the area of joint to a temperature of 90-100° C. Next, the temperature of the polyethylene envelope and the metal housing is maintained and the adhesive layer is heated by a gas-burner and gradually covered with heat-shrinkable fabric with little effort applied on the joint upwards. The overlapping edges are placed at 11 and 13 hours on a clock face and oriented from downward. The overlapping area of the heat-shrinkable fabric is laid with the heated inner surface of the locking plate, and the fabric is heat-shrunk by heating with a soft burner flame. Furthermore, the edge of the polyethylene envelope and heat-shrinkable fabric is laid with the inner surface of the applicator heated by a gas burner to a sweating temperature. The metal housing is fixed with two binding bands one on each end. The space of the joint to be insulated is filled with polyurethane foam through a hole in the metal housing. After filling the insulated space of the joint with polyurethane foam, the filling orifice is covered with a lid, which is fixed by means of a previously prepared binding band, leaving the gap between the housing and the lid less than 1 mm for air to exit.

However, this method cannot be applied in field conditions in a climate having low ambient temperatures that reach minus 60° C., such as in the installation of heat insulation of pipelines joints in the Far North in wintertime. This is because such methods require maintaining a constant positive ambient temperature while pouring polyurethane foam in the area of joint and a positive pipe temperature for the polyurethane foaming.

SUMMARY

The object of the invention is to provide a new method of forming thermal insulation on a welded joint between pre-insulated pipes (i.e. pipes, equipped with factory-fitted heat insulation) for pipelines to be buried under the surface. The pipelines are designed to transport oil and oil products in difficult climatic conditions (for example, at low temperatures down to minus 60° C.).

The result of the method is a heat insulation of welded joints of pre-insulated pipes that is relatively easy to construct, reliable in relatively harsh climatic conditions (such as at low temperatures), and durable.

The result is achieved using a method of installing thermal insulation on a welded joint of pipes having a factory heat insulation and a protective metal polymer envelope, the pipes being used in subsurface pipelining. Metal end sections of the pipes are free from factory anticorrosive coating. A gasket made of heat-shrinkable polymer tape with a locking (clamping) plate is installed over the metal joint. A heat-insulating coating consisting of polyurethane foam pipe coverings is provided as half-cylinders or segments of a different shape and is installed over the gasket. The geometrical dimensions of the pipe coverings are selected such that the insulation is positioned close to the adjacent ends of the factory heat insulation. A protective metal polymer envelope of the pipes is aligned with the insulation such that they form a smooth outer surface. The insulation is fastened with tie bands or straps having locks. A metal casing with an overlap is positioned about the protective metal polymer envelope and the insulation. The metal casing is made of galvanized sheet metal that is wrapped around the pipe and the pipe covering, and the free ends of which are placed on the upper generatrix of the pipe and have an overlap. The sheet metal is pre-tightened to fully cover the heat insulation and is fixed with the fastening elements. Afterwards, a heat-shrinkable fabric of heat-shrinkable polymer tape with a locking plate is applied outward from the outer casing and the metal envelope.

Additionally, the sealing of the joint between the metal polymer envelope and the pipe coverings can be carried out using hot-melt adhesive tape.

End edges of the factory pipe heat insulation and the adjacent pipe coverings may be formed to have stepped edges in a longitudinal direction that lock together.

In one embodiment of the invention, the pipe coverings are selected to have a width that is equal to a distance between the ends of the factory pipe heat insulation, with an acceptable technological gap of not more than 7 mm. Pipe coverings mounted on the gasket are tightened to increase their connection to each other and the envelope before locking using temporary straps with a tensioning mechanism. The pipe coverings are bonded in place using at least three tie straps with locks and, afterwards, the temporary straps are removed. The at least three tie straps are positioned as follows: one in the center of the weld joint, the other two positioned between 150 millimeters (150 mm) and 200 mm outward from the edge of the factory heat insulation. Temporary straps with tensioning mechanism are also used to pre-tie the galvanized metal sheet to hold it in place relative to the heat insulating coating and are removed after bonding of the sheet metal.

In some embodiments, the surface of the weld joint and the adjacent zone (metal end sections of welded pipe) are prepared before installing the gasket. Such preparation includes cleaning the metal surface using an abrasive blast method, and drying to a predetermined temperature based on measurements using contact thermometers placed at four equidistant points around the perimeter of the weld joint. Prior to installing the gasket, a uniform layer of primer, such as a two-component epoxy primer, may be applied onto the prepared surface.

When installing the gasket, one free end of the heat-shrinkable polymeric tape is heated with and subsequently fastened to the upper generatrix of the end sections of the welded pipes. Afterwards, tape is wrapped around the end sections of the welded pipes such that a sag is present, and the other (second) end of the tape is mounted on the first end with an overlap of at least 100 mm. The second end of the tape is heated and fixed on the first end. The area of tape overlap is fixed using a locking (clamping) plate, then it is rolled using a silicone roller to remove air bubbles. Then, the sag area of the heat-shrinkable polymeric tape is heated to shrink the tape to the size of the pipes' end sections. The heat-shrinkable polymeric tape may have a minimum thickness of 2 mm for pipes having diameters of 820 mm and less, and at least 2.4 mm for pipes having a diameter of over 820 mm. The heat-shrinkable polymeric tape (gasket) is set to overlap the factory anticorrosive coating of the connected pipes by an amount of at least 50 mm for pipes having a diameter up to 530 mm and at least 75 mm for pipes having a diameter of at least 530 mm. The heat-shrinkable polymeric tape has a degree of shrinkage in the longitudinal direction that is between 15 percent (15%) and 30%. The tape shall be of a length L determined using the relationship: $L=\pi \cdot D \cdot 1.05+150$, mm, where D is the outer diameter of the pipe, measured in mm.

The locking (clamping) plate is a dimensional cut of reinforced heat-shrinkable tape with a higher melting temperature of the adhesive layer than the heat-shrinkable tape of the gasket. The locking plate may include a reinforced heat-shrinkable tape having a degree of shrinkage in the longitudinal direction that is between 2% and 5% and a thickness between 1.4 mm and 1.6 mm.

In one embodiment of the invention, the mounted gasket is inspected using a procedure that includes visually inspecting the appearance of the gasket, measuring the size of gasket overlap (heat-shrinkable polymeric tape overlap) on the factory anticorrosive coating of the welded pipes, measuring the thickness of the gasket, measuring its dielectric continuity (which should be at least 5 kilovolts per mm (kV/mm)), and the adhesion of the gasket to the welded joint and to the pipe section with the factory anticorrosive coating (which should be at least 70 Newtons per centimeter (N/cm)).

In one of the embodiments of the invention, the hot-melt adhesive tape on the joint between the factory heat insulation having the protective metal polymeric envelope and the polyurethane foam pipe coverings is applied in two layers. Furthermore, the amount that the tape overlaps on the protective metal polymeric envelope of the pipe corresponds with the amount that the metal casing overlaps on the protective metal polymeric envelope. Prior to the installation of the hot-melt adhesive tape, the boundaries of the galvanized metal casing with the equal overlap on the envelope are marked on the envelope and hot-melt adhesive tape is installed at the marked borders. Hot-melt adhesive tape is selected to have a minimum thickness of 2 mm and a length L that is determined using the ratio: $L=\pi \cdot D+10$, where D is the outer diameter of the envelope, measured in mm.

The metal housing is to be mounted symmetrically with respect to the welded joint with an overlap on the protective metal envelope of at least 100 mm. The galvanized metal housing overlap areas, including overlapping loose ends, and the protective metal envelope around the edges of the housing are fastened using galvanized self-tapping screws with a press washer, or pusher pad, at intervals of between 80 and 100 mm, and at a distance from the edge of the housing between 10 and 20 mm. After installation of the housing, the appearance of heat insulation, the size of overlap on the protective metal envelope, and the distance between the screws and the housing edge are inspected.

In the particular embodiment, the heat-shrinkable fabric that seals the joints between the metal housing and the metal envelope includes at least three heat-shrinkable polymer tapes. Two of the tapes are mounted at the ends of the casing such that they overlap the protective metal polymeric envelope of the pipe by at least 110 mm. A third tape is mounted at the top of the center of the metal casing and overlaps the first two tapes. After installation of the heat-shrinkable fabric, it's quality is assessed by: visually inspecting the appearance of the heat-shrinkable fabric, measuring the overlap of the tapes on each other and on the protective metal polymeric envelope, measuring the thickness of the fabric, measuring the dielectric continuity, measuring an amount of adhesion of the coating to the protective metal polymeric envelope and to the metal casing, and measuring an amount of adhesion wherein the third tape overlaps the first two tapes.

Another solution for providing the result of insulation of welded pipes to be buried beneath a ground surface includes a particular composition of elements and their relative positioning. A heat insulating joint includes a heat-shrinkable polymer tape gasket with a locking (clamping) plate. The gasket is mounted on a surface of metal end sections of the welded pipes that is free from factory anticorrosive coating. A heat insulating coating of polyurethane foam pipe coverings is provided that include two or more semi-cylinders or segments of a different shape that may be placed together and form a structure that defines an opening for the welded joint. The dimensions of the insulation are selected to allow them to be positioned relatively close to adjacent ends of the factory heat insulation and a protective metal polymeric envelope of the pipes. The insulation forms a smooth outer surface with the metal polymeric envelope. The pipe coverings are bonded using one or more tie strap with a lock. The metal casing is placed symmetrically relative to the weld joint and is formed such that it overlaps the factory pipe protective metal polymeric envelope. A heat-shrinkable fabric of heat-shrinkable polymer tape with one or more locking plates is applied to the outer surface of the metal casing and the metal envelope of the pipes. The metal casing is made of galvanized metal sheet. The free ends are placed from the upper generatrix of the pipe such that they overlap, and are fixed using fasteners.

Design features that characterize the heat insulating joint and its individual constituent elements are described in the above summary of the method for performing the heat insulation of the weld joint.

Thus, the invention involves the use of dismountable heat insulation structures, thereby allowing for a lightweight, fast and reliable insulation installation that can be welded into a string of pipes in the field. The proposed improved method of heat insulation installation on the pipeline is less time consuming relative to the closest analogue, and is more economical. The resulting heat insulation design for the subsurface located pipeline has the necessary strength to withstand different deformations that occur during subsurface pipelining with the insulation.

BRIEF DESCRIPTION OF THE DRAWINGS

The features of the disclosure are illustrated by the following drawings.

DETAILED DESCRIPTION

Figure 1:
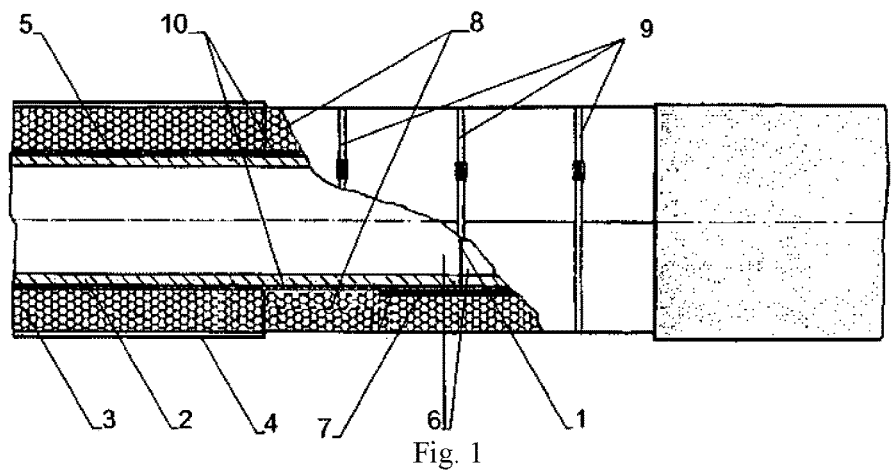
FIG. 1 is a diagram illustrating a welded joint heat insulation design without a housing installed.
Figure 2:
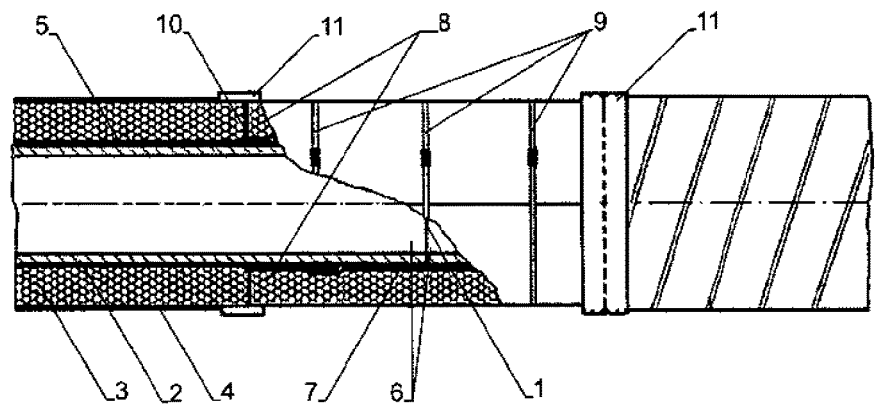
FIG. 2 is a diagram illustrating the mounting of a metal housing for heat insulation of the welded joint of FIG. 1 for above surface pipes.
Figure 3:
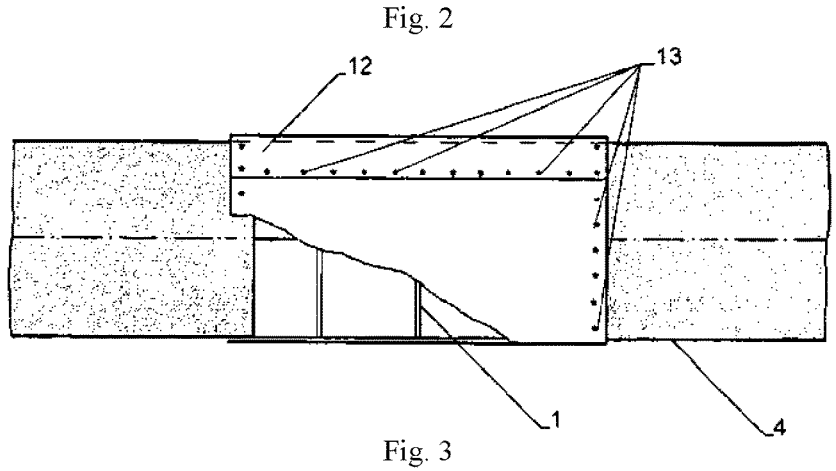
FIG. 3 is a diagram illustrating edges of pipe coverings and adjacent factory-fitted insulation, the edges having a stepped shape.
Figure 4:
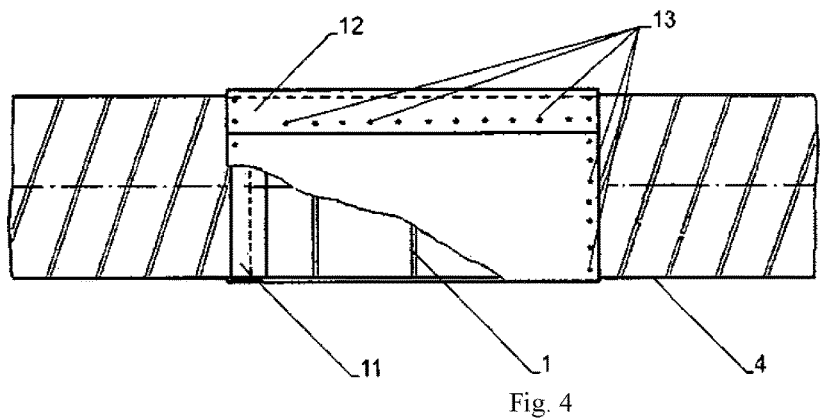
FIG. 4 is a diagram illustrating a metal casing positioned about the welded joint of FIG. 1 and a metal envelope of adjacent pipes.
Figure 5:
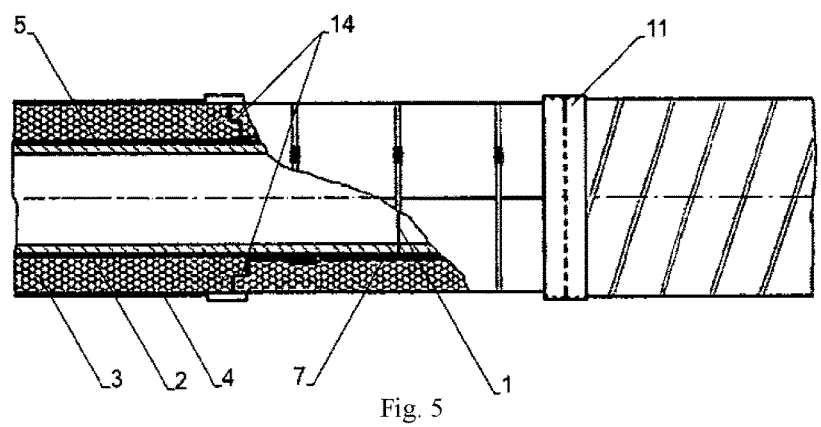
FIG. 5 is a diagram illustrating a stepped shape formed in edges of an insulating pipe covering and adjacent edges of a factory installed insulation.

The drawings include the following elements along with their corresponding reference numbers:

1. welded joint,
2. steel pipe,
3. factory heat insulation of a steel pipe,
4. protective metal polymeric envelope (external) of a steel pipe,
5. factory anticorrosive coating of a steel pipe,
6. welded metal end sections of pipes,
7. gasket of heat-shrinkable polymeric tape for preliminary anticorrosion protection of the welded joint,
8. pipe covering made of polyurethane foam that forms a heat insulation coating when assembled,
9. tightening metal bands with a lock that are to be mounted on the pipe covering,
10. a joint between the factory heat insulation 3, the protective metal polymeric envelope 4 and the pipe coverings 8,
11. hot-melt adhesive tape, glued on the joint 10,
12. the metal casing made of galvanized metal sheet,
13. fasteners,
14. end edges of the pipe factory heat insulation and adjacent pipe covering having a stepped shape in longitudinal section,
15. and 16—heat-shrinkable polymeric tapes that are installed on the metal casing 12, forming the heat-shrinkable fabric.

Locking plates that are mounted on heat-shrinkable polymeric tapes and temporary straps with a tensioning mechanism that are mounted on the pipe covering and on the galvanized metal casing are not shown.

Definitions

A protective metal envelope of a metal pipelining (factory-fitted) is a cylindrical structure mounted on the outer surface of the pipe heat insulation to protect it from mechanical damages and environmental impacts and includes an anticorrosive coating.

Polyurethane foam pipe coverings are segments of polyurethane foam that are made by pouring the foam into a mold of a predefined shape and hardening the foam.

An exemplary method of installation of fire and heat insulation of welded joints of pipes for below surface pipelining is implemented as follows.

The disclosure is intended primarily for use in subsurface pipelining in severe climatic conditions (such as those reaching minus 60 degrees Celsius (° C.)) of a pipeline system for transporting oil and oil products. The pipeline system for these conditions is constructed of pre-insulated pipes (sections) having a diameter of up to 1,020 millimeters (mm) and having a factory heat insulation 3 positioned about steel pipes 2 that have an anticorrosive coating 5. A protective metal polymeric envelope 4 is positioned outward from the insulation 3. Pipes have end sections 6 that are free from the factory heat insulation. A portion of the end sections surface has an anticorrosive coating 5 and a portion has no anticorrosive coating. The end sections of the pipes 6 are welded into the pipeline system in the field. If there is a positive opinion on the quality of welded joint of pipes (i.e., the welded joint 1 has been determined to be acceptable), welded joint heat insulation works are launched (i.e., steps to install a thermal insulation are performed).

The steps for installing the heat insulation of the welded joint 1 include applying a preliminary anticorrosive protection of to the welded joint using a gasket 7 made of heat-shrinkable polymeric tape. To do this, the surface of the welded joint is prepared at a distance of not less than 200 mm from the joint. The surface of the welded joint is cleaned of to remove dirt, dust, grease, moisture, and the like, and is then dried by heating with a gas burner to a predetermined temperature. The predetermined temperature depends on the grade of the heat-shrinkable polymeric tape, c. The temperature is checked using multiple contact thermometers positioned at four equidistant points around the perimeter of the welded joint. If the surface is heated above the desired temperature, heating is stopped to reach the temperature normative values such that the temperature can be reduced to the predetermined temperature. The metal surface is cleaned using a blast abrasive method, which includes cleaning of the area of the factory-fitted anticorrosive coating of the pipe that is adjacent to the cleaned area, at a distance of not less than 100 mm from the edge of the anticorrosive coating of the pipe anticorrosive coating. Next, the prepared surface is coated with an even layer of primer, such as a two-component epoxy primer (comprising an epoxy resin and a hardener). The time from the start of mixing of primer components to its application on the pipe surface should not exceed the time indicated in the manufacturer's technical documentation for the primer.

The gasket made of heat-shrinkable polymeric tape is mounted on the surface that is coated with primer. For this purpose, the cleaned surface in the area of the welded joint is heated to the temperature specified by the manufacturer of the heat-shrinkable polymeric tape (such as between 95° C. and 105° C.) using a gas-burner, for subsequent application of heat-shrinkable polymeric tape. The heating temperature parameters of the cleaned pipe surface are determined based on the parameters of the particular brand and composition of the heat-shrinkable polymeric tape. The heat shrinkable polymeric tape is a two-layer insulating material consisting of a heat and light stabilized, electronically or chemically sewed, longitudinally oriented polymeric layer of the tape and an adhesive layer (adhesive) that may include hot-melt polymer compounds specified by the manufacturer. While applying heat-shrinkable polymeric tape on the surface of the welded joint, the welded joint temperature is also measured using a contact thermometer in four equidistant points around the perimeter of the welded joint. The thickness of the heat-shrinkable polymeric tape gasket is chosen depending on the diameters of the pipes used (see Table 1 below).

TABLE 1

The thickness of the coating area of welded joints depending on the pipeline diameter.

| Pipeline diameter, mm | Minimum coating thickness, mm, not less than |
| --- | --- |
| Up to 273 | 1.2 |
| Over 273 to 530 | 1.8 |
| Over 530 to 820 | 2.0 |
| Over 820 | 2.4 |

The gasket of heat-shrinkable polymeric tape 7 is mounted around the welded joint 1. The polyethylene coating is on top and the lower adhesive layer is applied to the welded joint, with the upper end overlapping the lower one. The size of the overlap should be at least 100 mm. When mounting the heat-shrinkable polymeric tape, the lower end is heated using a burner flame on the side of the adhesive layer, preventing the shrinkage of polyethylene, and is then pressed to the surface of the welded joint coated having the primer. The size of overlap of the heat-shrinkable polymeric tape on the factory-fitted anticorrosive coating adjacent to the welded joint area is at least 50 mm for pipelines having a diameter up to and including 530 mm, and at least 75 mm for pipelines having a diameter greater than 530 mm.

The heat-shrinkable polymeric tape is wrapped around the insulated surface with a "sag" located at the bottom of the forming pipe. Then, its second end (top) is also heated with a burner on the side of the adhesive layer and placed overlapping over the lower end. The overlap of the heat-shrinkable polymeric tape ends is rolled using a roller to remove any air bubbles. Thus, the heat-shrinkable polymeric tape, when closed in a ring, has the "sag" of the fabric that will be later shrinked. Then the area of the upper end of the heat-shrinkable polymeric tape overlapping the lower end is fastened with a locking plate, which is a measuring section of a reinforced heat-shrinkable tape having a higher adhesive layer melting temperature than the heat-shrinkable polymeric tape gasket. The locking plate is heated with a burner flame and is mounted directly on the overlap of the tape ends with the adhesive layer downwards and the polyethylene layer upwards. This provides the advantage of preventing the "opening" of the overlap of the tape ends during installation and shrinkage of the tape. After installation, the locking plate is heated with a yellow burner flame until the overlapping contours are visible underneath. Afterwards, the assembly is rolled to the surface of the pipe using a roller to remove any air bubbles and to level the entire material. The shrinkage of the heat-shrinkable polymeric tape gasket is started immediately after the installation of the plate using a burner, evenly distributing the flame, from the bottom of the forming pipe, that is, the area of the maximum tape sag. A preferred shrinkage is performed from the center of the tape to one side and then from the center of the tape to the other side, moving the burner around the diameter of the pipe, while avoiding overheating of the tape fabric. If a uniform and simultaneously intensive heating is performed, the tape shrinks without air bubbles and buckles.

After applying anticorrosive protective coating on the welded joint in the form of the gasket 7 made of heat-shrinkable polymeric tape, the coating is inspected. In particular, the following features of the coating are inspected: its appearance, the size of overlap on the factory-fitted anticorrosive coating 5, the gasket thickness, its dielectric continuity (which should be of at least 5 kilovolts per mm (kV/mm)), and the adhesion of the gasket to the welded joint and the pipe section with factory-fitted anticorrosive coating (which should be of at least 70 Newtons per centimeter (N/cm)).

After the inspection, the heat-insulating pipe coverings 8 are installed. The pipe coverings 8 resemble segments of a hollow cylinder and are made of polyurethane. The assembled heat insulation coating made of pipe coverings may be a hollow 2-segment cylinder (when the outer diameter of the pipe 2 is up to 820 mm), a hollow 3-segment cylinder (when outer diameter of the pipe 2 is between 820 mm and 1,020 mm), or a hollow 4-segment cylinder (when the outer diameter of the pipe to exceeds 1,020 mm).

The pipe coverings 8 are chosen to have geometrical dimensions that provide the smallest possible gap (less than 0.7 mm) between the pipe coverings 8 and the factory-fitted insulation 3 so that a smooth outer surface is formed with the factory-fitted insulation 3. For that purpose, the distance between the ends of the factory-fitted insulation 3 is measured, and if the pipe coverings' width is bigger than the measured value, the pipe coverings are cut to the desired size. In order to form a smooth outer surface of the mounted pipe coverings and the protective metal envelope 4, the thickness of the pipe coverings at the joint 1 may be less than the total thickness of the factory-fitted insulation layer and the protective metal envelope 4. The size of the pipe coverings 8 may be similar to the gasket 7 made of heat-shrinkable polymeric tape and the pipe coverings 8 may be mounted on the welded joint.

Experimental development carried out in Transneft R & D, LLC showed that the optimal number of pipe coverings is the number indicated in Table 2, depending on the diameter of the pipe.

TABLE 2

The number of pipe coverings depending on the diameter of the pipe.

| Pipe diameter, mm | Number of pipe coverings, mm |
|---|---|
| Up to and including 820 | 2 |
| Over 820 to 1,020 inclusive | 3 |
| Over 1,020 | 4 |

When installing two pipe coverings, their joints should be in the positions corresponding to "3" and "9" o'clock (corresponding to positions on a clock face). When installing three pipe coverings, their joints' positions should correspond to "2", "6", and "10" o'clock. When installing four pipe coverings, their joints' positions should correspond to "2", "5", "8", and "11" o'clock. Heat insulation coating can be collected from pipe coverings with their transverse joints, and the pipe coverings can have male and/or female tool joints along the entire length of the end surface. This allows for their installation to be close to each other.

The transverse joints are protected with a sealant. Afterwards, temporary belts are mounted on the assembled pipe coverings 8 and tightened to couple the joints of the pipe coverings, reducing the likelihood of damage to the pipe coverings. After that, at least three metal bands 9 having a lock are mounted on pipe coverings. One of the metal bands 9 is in the middle of the welded joint, and two other metal bands 9 are positioned at a distance between 150 mm and 200 mm from the pipe covering edge. The metal bands are tightened using a tensioner.

Next, the joint 10 between the factory-fitted heat insulation 3 with a protective metal envelope 4 and the pipe coverings 8 are sealed with a hot-melt adhesive tape 11. Afterwards, the metal casing 12 is installed symmetrically with the welded joint and overlaps the protective metal envelope 4 of the metal pipe 2. Before installing the hot-melt adhesive tape 11, the metal protective envelope 4 is marked to show the boundaries of positioning of the galvanized metal casing 12, ensuring equal overlap on the protective metal envelope 4. Next, the hot-melt adhesive tape 11 is positioned on the marked boundaries, overlapping the heat insulation coating made of pipe coverings 8.

The hot-melt adhesive tape 11 is installed by heating the metal protective envelope 4 by holding a burner flame to the marked boundaries and applying the hot-melt adhesive tape in two layers, overlapping the tape, on the pipe coverings 8. The combined two layers of hot-melt adhesive tape may be 200 mm plus or minus 5 mm wide and 2.0 mm plus or minus 0.2 mm thick. Then, the metal casing 12 made of galvanized sheet metal is wrapped around the portion of the pipe having the heat insulating coating made of pipe coverings 8. The loose ends of the metal casing 12 are placed on the side of the upper forming pipe with an overlap oriented downward. The overlap should be in the positions corresponding to "1" to "2" o'clock or from "10" to "11" o'clock and should be at least 100 mm. This metal housing is pre-bound using belts with a tensioning mechanism (not shown) to fully extend around the heat insulation coating 8. Afterwards, the housing edges are heated using a gas burner flame to melt the hot-melt adhesive tape positioned underneath, and the belts with tensioning mechanism are finally tightened and then removed after bonding the sheet with tie bands with locks or using fasteners 13. Fasteners, such as galvanized self-tapping screws having a press washer are positioned at every 80-100 mm and at 10-20 mm from the housing edge. The deviation of the placement of fasteners from the line should not exceed 5 mm. After being installed, the metal casing 12 should cling to the heat insulation coating made of pipe coverings 8.

The quality of the heat insulation installation and the protective coating of the metal (galvanized) casing 12 is determined by visually inspecting the appearance of the insulation installation and metal casing 12, the size of overlap on the factory-fitted protective metal envelope of pipes (on the pipe perimeter), the size of the overlap of the housing ends against each other and positioned along the generatix, and the distance between the screws and the housing edge.

Figure 6:
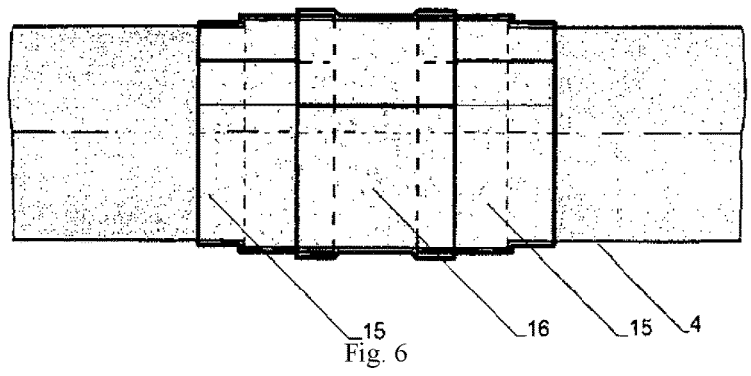
FIG. 6 is a diagram illustrating heat-shrinkable polymeric tapes of heat-shrinkable fabric installed outward from the metal casing of FIG. 4.

After validating the quality of the installation of the insulation and protective coating, the surface of the casing 12 is dried by heating the surface with a gas burner with temperature control and verifying the temperatures using contact thermometers at four equidistant points about the circumference. The surface of the casing 12 is cleaned using an abrasive blast method. An adjacent area of the protective metal polymeric envelope 4 is also cleaned for a distance of at least 100 mm. Two heat-shrinkable polymer tapes 15 having a width of 650 mm are mounted at the edges of the casing 12 and overlap the protective metal polymeric envelope 4 by at least 110 mm. A third heat-shrinkable polymeric tape 16 is set on the top in the middle and overlaps the first two heat-shrinkable polymer tapes 15, as shown in FIG. 6. The installation of heat-shrinkable tapes on the metal casing is performed similarly to the installation of heat-shrinkable tapes that forms the gasket 7.

Quality assurance of the heat-shrinkable fabric applied on the metal casing includes the following: visually inspecting the appearance of the coating, measuring the amount of overlap on the protective envelope 4 of insulated pipes that connect into the junction, measuring the amount of overlap on adjacent tapes, measuring the thickness of the coating, measuring the dielectric continuity, measuring the adhesion of the coating to the protective envelope 4 and to the galvanized casing 12, and measuring the adhesion at the area of overlap of adjacent tapes.

The method described above provides anticorrosive protection and heat insulation of welded pipe joints of subterranean pipelines in relatively cold environments while simplifying the installation of heat insulation of joints of the pipelines. The method also increases the service life of the welded pipelines. In addition, the proposed method provides improved installation technology of heat insulation on the pipelines, which in turn reduces the cost and labor required for installation.

The invention claimed is:

1. A heat-insulated joint of pipes to be laid underground and having a factory-fitted heat insulation positioned about a welded joint, a protective metal envelope, and factory-fitted anticorrosive free end portions, comprising:
   a gasket of heat-shrinkable polymeric tape positioned about the welded joint;
   a heat-insulation coating having polyurethane pipe coverings positioned about the gasket and including at least two segments of a shape, and having geometrical dimensions that are similar to a space between factory-fitted heat insulation of the pipes;
   a sealant covering transverse joints of the polyurethane foam pipe coverings;
   a tie band positioned about the polyurethane pipe coverings;
   a metal casing including galvanized sheet metal, being positioned about the polyurethane pipe coverings, overlapping the protective metal envelope of the pipes, and having loose ends that overlap near a top of the welded joint; and
   a heat-shrinkable polymer tape sealing a joint between the metal casing and the protective metal envelope.

2. The heat-insulating joint of claim 1, further comprising a hot-melt adhesive tape sealing a joint between the protective metal envelope of the pipes and the glass foam pipe coverings.

3. The heat-insulating joint of claim 1, wherein the heat-shrinkable polymer tape includes a first polymer tape sealing a first joint between the metal casing and a first protective metal envelope, a second polymer tape sealing a second joint between the metal casing and the second protective metal envelope, and a third polymer tape that overlaps the first polymer tape and the second polymer tape.

4. The heat-insulated joint of claim 1, wherein edges of the factory-fitted heat insulation and edges of adjacent pipe coverings have a stepped shape in a longitudinal direction to form a tool joint.

5. The heat-insulated joint of claim 1, wherein the gasket overlaps a factory-fitted anticorrosive coating of the pipes by at least 50 mm when a diameter of the pipes is less than or equal to 530 mm, and at least 75 mm when the diameter of the pipes is at least 530 mm.

6. The heat-insulated joint of claim 1, wherein the gasket has a shrinkage degree that is between 15% and 30% in a longitudinal direction and includes a locking plate having a reinforced heat-shrinkable tape having a degree of shrinkage in a longitudinal direction that is between 2% and 5%, and wherein the locking plate has a higher adhesive layer melting temperature than that of the gasket.

7. The heat-insulated joint of claim 1, wherein the heat-shrinkable polymer tape overlaps the protective metal envelope by at least 110 mm.

8. The heat-insulated joint of claim 1, wherein the tie band includes at least 3 tie bands including a first tie band positioned in a middle of the welded joint and at least two tie bands positioned between about 150 mm and 200 mm from edges of the factory-fitted heat insulation.

9. The heat-insulated joint of claim 1, further comprising fasteners securing the metal casing in place wherein the fasteners include galvanized self-tapping screws and press washers and are spaced apart by between 80 mm and 100 mm on an overlap of the loose ends, and positioned from an edge of the casing by between 10 mm and 20 mm.

* * * * *